US006690915B1

United States Patent
Ito et al.

(10) Patent No.: US 6,690,915 B1
(45) Date of Patent: Feb. 10, 2004

(54) BOOSTER, MONITORING APPARATUS, BOOSTER SYSTEM, CONTROL METHOD AND MONITORING METHOD

(75) Inventors: Yasushi Ito, Kanagawa (JP); Kazuhito Ito, Miyagi (JP)

(73) Assignee: NTT DoCoMo, Inc., Tokyo (JP)

( * ) Notice: Subject to any disclaimer, the term of this patent is extended or adjusted under 35 U.S.C. 154(b) by 389 days.

(21) Appl. No.: 09/650,152

(22) Filed: Aug. 29, 2000

(30) Foreign Application Priority Data

Aug. 31, 1999 (JP) .......................................... 11-246501

(51) Int. Cl.[7] .............................................. H04B 3/36
(52) U.S. Cl. ............................ 455/7; 455/571; 370/492
(58) Field of Search .............................. 455/7, 8, 9, 10, 455/11.1, 12.1, 13.1, 13.2, 13.3, 13.4, 14, 15, 16, 17, 18, 19, 20, 21, 22, 23, 24, 25, 571; 370/243, 246, 274, 492, 501

(56) References Cited

U.S. PATENT DOCUMENTS

| 5,138,277 A | * | 8/1992 | Robinson et al. ........... 330/281 |
| 5,634,191 A | * | 5/1997 | Beasley ........................ 455/20 |
| 5,802,452 A | * | 9/1998 | Grandfield et al. ........... 455/20 |
| 6,317,582 B1 | * | 11/2001 | Yoshinaga .................. 455/11.1 |
| 6,404,775 B1 | * | 6/2002 | Leslie et al. ................. 370/466 |
| 6,469,984 B1 | * | 10/2002 | Baker ......................... 370/232 |

OTHER PUBLICATIONS

Suzuki et al., "Design of a Tunnel Relay System with a Leaky Coaxial Cable in an 800–MHz Band Land Mobile Telephone System," IEEE Transactions on Vehicular Technology, vol. VT–29, No. 3, pp. 305–316, Aug. 1980.

Ohdate, "A Frequency Offset Booster with an Oscillation Prevention Function for Land Mobile Communication," 37th IEEE Vehicular Technology Conference, pp. 430–434, 1987.

Klingler, "Radio Coverage for Road and Rail Tunnels in the Frequency Range 75 to 1000 MHz," 41st IEEE Vehicular Technology Conference, pp. 433–438, May 1991.

Suzuki et al., "A Booster Configuration with Adaptive Reduction of Transmitter–Receiver Antenna Coupling for Pager Systems," 50th IEEE Vehicular Technology Conference, pp. 1516–1520, Sep. 1999.

Itoh et al., "Auto Gain Adjustment Booster for W–CDMA," IEICE General Convention 2000, B–5–82, p. 467, Mar. 2000.

* cited by examiner

Primary Examiner—William Trost
Assistant Examiner—Nghi H. Ly
(74) Attorney, Agent, or Firm—Workman Nydegger (57) ABSTRACT

A booster is provided which controls its gain to reduce the adverse effect of the booster noise on a base station. It receives a perch signal transmitted from a base station; measures received power of the perch signal at the booster; receives information about the transmission power of the perch signal from the base station; and measures the noise power of the amplified uplink signal at the booster. It controls the gain of the uplink signal and/or the gain of the downlink signal in response to the transmission power of the perch signal of the base station, the received power of the perch signal at the booster, and the noise power of the amplified uplink signal at the booster.

75 Claims, 4 Drawing Sheets

BOOSTER, MONITORING APPARATUS, BOOSTER SYSTEM, CONTROL METHOD AND MONITORING METHOD

This application claims the priority of Patent Application No. 11-246501 filed Aug. 31, 1999 in Japan, the content of which is incorporated hereinto by reference.

BACKGROUND OF THE INVENTION

1. Field of the Invention

The present invention relates to a booster for receiving, amplifying and transmitting signals to be transferred between a base station and a mobile station, a monitoring equipment of the booster, a booster system, a control method of the booster and a monitoring method of the booster.

2. Description of the Related Art

Conventionally, the gain of a booster is adjusted at the installation of the booster before its operation. Assuming that the gain of a booster is $G_b$, the noise figure of the booster is $NF_b$, its thermal noise is $N_{kT}$, the noise at a base station without the booster is $N_{bs}$, and the propagation loss between the booster and base station is L, the noise $N_{bs}'$ at the base station when the booster is equipped, is expressed as follows:

$$N_{bs}'=G_b NF_b N_{kT}/L+N_{bs} \quad (1)$$

It is preferable that the effect of the noise produced by the booster on the base station be sufficiently small, satisfying the following expression.

$$N_{bs}>>G_b NF_b N_{kT}/L \quad (2)$$

When a new base station is installed near the booster, the booster is readjusted to make the effect of the booster on the new base station sufficiently small.

Conventionally, a new base station installed in an area covered by the booster because of poor radio wave intensity in mobile communication can suffer from the noise or interference of the booster. In particular, the system performance of CDMA (Code Division Multiple Access) utilizing the same frequency depends greatly on the interference. Thus, it is preferable that the effect of the interference be reduced as much as possible by decreasing the gain of the booster.

Conventionally, however, because of the fixed gain of the booster, the gain of the booster must be readjusted manually at the spot every time a new base station is installed near the booster.

Generally, comparing the area under the booster where the booster exchanges radio waves with mobile stations in the CDMA with the area under the base station where the base station exchanges radio waves directly with the mobile stations, the area under the base station is greater.

For example, assume that a condition changes from the initial state in which the traffic under the booster is heavy and the traffic under the base station is light to a state in which the traffic under the base station is heavy. To increase the traffic under the base station, the traffic under the booster must be limited by reducing the gain of the booster, for example.

Conventionally, however, because the gain of the booster is fixed, it cannot be reduced.

Furthermore, since the booster is a device for receiving and amplifying radio waves, and transmitting them into space, its failure or malfunction will have a large effect on channel quality. Accordingly, it is preferable to monitor an increasing number of items. In addition, it is desirable to monitor not only amplifiers, but also failures of operation circuits and the like.

For example, when the gain of an uplink signal is much smaller than the gain of a downlink signal, the mobile station increases its transmission power to maintain prescribed quality. Accordingly, it is difficult for the base station to detect a failure of the booster. Thus, it is preferable to install a monitor-control equipment to carry out suitable monitoring of the booster using information about parameters for setting the gain of the booster, information about the condition of the booster and the like which information is transmitted to the monitor-control equipment, thereby detecting and controlling the failure or malfunction of the booster.

SUMMARY OF THE INVENTION

It is therefore an object of the present invention to reduce the adverse effect of the booster noise on the base station by controlling the gain of the booster.

Another object of the present invention is to adjust the balance between the traffic under the booster and the traffic under the base station by controlling the gain of the booster.

Still another object of the present invention is to carry out suitable monitoring of a booster by transmitting information about the booster (information about parameters for setting the gain of the booster, information about the condition of the booster and the like) to a monitoring equipment so that the monitoring equipment monitors the booster using these information items.

A method will now be described of reducing the adverse effect of the booster noise on the base station by controlling the gain of the booster.

Assume that the booster amplifies the radio waves (uplink signal) transmitted from the mobile station, and that the propagation loss between base station A and the booster is $L_1$ [dB]. If the expression $N_o>>N_b-L_1$ is satisfied, where $N_o$ [dBm] is the noise power at the base station A, and $N_b$ [dBm] is the noise power of the amplified uplink signal at the booster, it can be said that the $N_b$ has little effect on the base station A. In other words, it can be said that the booster noise has little effect on the base station A if the following expressions are satisfied.

$$N_b<<L_1+N_o \quad (3)$$

$$G_b<<L_1+NF_o-NF_b \quad (4)$$

where $G_b$ is the gain of the booster, $NF_b$ is the noise figure of the booster, and $NF_o$ is the noise figure of the base station A.

Next, assume that a new base station B is installed at a location at which its propagation loss $L_2$ is less than the propagation loss $L_1$. Without the readjustment of the gain of the booster, the effect of the booster noise on the base station B is greater than that on the base station A by an amount of about $L_1-L_2$.

When the propagation loss between the base station B and the booster is $L_2$, where $L_1>L_2$, the gain of the booster $G_b$ should be adjusted to satisfy the following expressions.

$$N_b<<L_2+N_o \quad (5)$$

$$G_b<<L_2+NF_o-NF_b \quad (6)$$

Next, a method will be described of adjusting the balance between the traffic under the booster and the traffic under the booster by controlling the gain of the booster.

Assume that the interference quantity in the base station is $I_o$, and that the interference quantity of an uplink signal input in the booster is $I_b$, the interference quantity in the base station from the uplink signal which is amplified by the booster and transmitted to the base station is $I_b'$, and the propagation loss between the base station and the booster is L. If the traffic is limited to that under the booster, the following expression holds.

$$I_o = I_b' = G_b + I_b - L \quad (7)$$

For example, when the interference quantity $I_o$ in the base station is large and approximately satisfies the expression above, it can be estimated that the traffic under the booster is heavy, bearing severely upon the traffic under the base station. If the gain of the booster is reduced in such a case, the uplink communication of the CDMA tries to maintain the received level of the base station at a fixed level by carrying out transmission power control. Thus, the reduction in the booster gain little affects the interference quantity and traffic at an initial stage.

However, since the transmission power of the mobile stations has a limit, the interference quantity $I_b'$ from the booster to the base station gradually reduces, with the reduction in the received power of the downlink signal, thereby reducing the area under the booster. The decreasing interference quantity in the base station can increase the traffic under the base station.

In summary, since the same frequency is used by a plurality of users in the CDMA, the received level and noise power density of the booster increase with the traffic under the booster. Varying the gain of the booster with the increase can change the area, thereby limiting the traffic under the booster.

To accomplish the foregoing object, in a first aspect of the present invention, there is provided a booster for receiving, amplifying and transmitting a signal to be transferred between a base station and a mobile station, the booster comprising:

an uplink signal amplifier for amplifying an uplink signal from the mobile station to the base station;

a received power measuring unit for receiving a reference signal sent from the base station, and for measuring received power of the reference signal at the booster;

a transmission power information receiver for receiving information about transmission power of the reference signal at the base station;

a noise power measuring unit for measuring noise power at the booster of the uplink signal amplified by the uplink signal amplifier; and a gain controller for controlling an gain of the uplink signal in response to the transmission power of the reference signal at the base station, the received power of the reference signal at the booster and the noise power of the amplified uplink signal at the booster.

Here, the booster may further comprise:

a downlink signal amplifier for amplifying a downlink signal sent from the base station to the mobile station, and the gain controller may further control the gain of the downlink signal in response to the transmission power of the reference signal at the base station, the received power of the reference signal at the booster and the noise power of the amplified uplink signal at the booster.

The booster may further comprise:

an interference measuring unit for measuring an interference quantity of the amplified uplink signal in the booster; and an interference quantity information receiver for receiving information about an interference quantity in the base station, and the gain controller may control the gain of the uplink signal in response to the transmission power of the reference signal at the base station, the received power of the reference signal at the booster, the noise power of the amplified uplink signal at the booster, the interference quantity of the amplified uplink signal in the booster and the interference quantity in the base station.

The booster may further comprise:

a downlink signal amplifier for amplifying a downlink signal sent from the base station to the mobile station, and the gain controller may further control the gain of the downlink signal in response to the transmission power of the reference signal at the base station, the received power of the reference signal at the booster, the noise power of the amplified uplink signal at the booster, the interference quantity of the amplified uplink signal in the booster and the interference quantity in the base station.

In a second aspect of the present invention, there is provided a booster for receiving, amplifying and transmitting a signal to be transferred between a base station and a mobile station, the booster comprising:

an uplink signal amplifier for amplifying an uplink signal sent from the mobile station to the base station;

a received power measuring unit for receiving a reference signal sent from the base station, and for measuring received power of the reference signal at the booster;

a transmission power information receiver for receiving information about transmission power of the reference signal at the base station;

an interference measuring unit for measuring an interference quantity in the booster of the uplink signal amplified by the uplink signal amplifier;

an interference quantity information receiver for receiving information about the interference quantity in the base station; and a gain controller for controlling the gain of the uplink signal in response to the transmission power of the reference signal at the base station, the received power of the reference signal at the booster, the interference quantity of the amplified uplink signal in the booster and the interference quantity in the base station.

Here, the booster may further comprise:

a downlink signal amplifier for amplifying a downlink signal sent from the base station to the mobile station, and the gain controller may further control the gain of the downlink signal in response to the transmission power of the reference signal at the base station, the received power of the reference signal at the booster, the interference quantity of the amplified uplink signal in the booster and the interference quantity in the base station.

The reference signal may include information about the interference quantity in the base station, and the interference quantity information receiver may receive the information about the interference quantity in the base station by receiving the reference signal.

The reference signal may include information about transmission power of the reference signal at the base station, and the transmission power information receiver may receive the information about the transmission power of the reference signal at the base station by receiving the reference signal.

In a third aspect of the present invention, there is provided a booster for receiving, amplifying and transmitting a signal to be transferred between a base station and a mobile station, the booster comprising:

an uplink signal amplifier for amplifying an uplink signal sent from the mobile station to the base station;

a received power measuring unit for receiving a reference signal sent from the base station, and for measuring received power of the reference signal at the booster;

a noise power measuring unit for measuring noise power at the booster of the uplink signal amplified by the uplink signal amplifier; and an information transmitter for transmitting information about the received power of the reference signal at the booster and about the noise power of the amplified uplink signal at the booster to a monitoring equipment for monitoring the booster.

Here, the booster may further comprise:

an interference measuring unit for measuring an interference quantity of the amplified uplink signal in the booster, and the information transmitter may transmit information about the interference quantity of the amplified uplink signal in the booster to the monitoring equipment for monitoring the booster.

In a fourth aspect of the present invention, there is provided a booster for receiving, amplifying and transmitting a signal to be transferred between a base station and a mobile station, the booster comprising:

an uplink signal amplifier for amplifying an uplink signal sent from the mobile station to the base station;

a received power measuring unit for receiving a reference signal sent from the base station, and for measuring received power of the reference signal at the booster;

an interference measuring unit for measuring an interference quantity in the booster of the uplink signal amplified by the uplink signal amplifier; and information transmitter for transmitting information about the received power of the reference signal at the booster and about the interference quantity of the amplified uplink signal in the booster to the monitoring equipment for monitoring the booster.

Here, the booster may further comprise:

an interference quantity information receiver for receiving information about an interference quantity in the base station, and the information transmitter may transmit, to the monitoring equipment for monitoring the booster, the information about the interference quantity in the base station.

The reference signal may include the information about the interference quantity in the base station, and the interference quantity information receiver may receive the information about the interference quantity in the base station by receiving the reference signal.

The booster may further comprise:

a transmission power information receiver for receiving information about transmission power of the reference signal at the base station, and the information transmitter further may transmit the information about the transmission power of the reference signal at the base station to the monitoring equipment for monitoring the booster.

The reference signal may include the information about the transmission power of the reference signal at the base station, and the transmission power information receiver may receive the information about transmission power of the reference signal at the base station by receiving the reference signal.

The booster may further comprise:

a booster information acquisition unit for capturing information about a condition of the booster, and the information transmitter may transmit the information about the condition of the booster to the monitoring equipment for monitoring the booster.

The information transmitter may transmit information about the gain of the uplink signal to the monitoring equipment for monitoring the booster.

The booster may further comprise a downlink signal amplifier for amplifying a downlink signal from the base station to the mobile station.

The information transmitter may transmit the information about the gain of the downlink signal to the monitoring equipment for monitoring the booster.

The downlink signal amplifier may be able to change a time constant for adjusting the gain of the downlink signal.

The booster may further comprise:

a control signal receiver for receiving a control signal from the monitoring equipment; and a booster controller for controlling the booster in accordance with the control signal.

The booster controller may control, when the control signal is a signal for controlling the gain of the uplink signal and/or the gain of the downlink signal, the gain of the uplink signal and/or the gain of the downlink signal in accordance with the control signal.

The reference signal may be a perch signal.

The uplink signal amplifier may be able to vary a time constant for adjusting the gain of the uplink signal.

The downlink signal amplifier may be able to vary a time constant for adjusting the gain of the downlink signal.

In a fifth aspect of the present invention, there is provided a booster for receiving, amplifying and transmitting a signal to be transferred between a mobile station and a base station, wherein the booster can vary a time constant for adjusting an gain of the signal.

In a sixth aspect of the present invention, there is provided a monitoring equipment for monitoring a booster for receiving, amplifying and transmitting a signal to be transferred between a mobile station and a base station, the monitoring equipment comprising:

a first information receiver for receiving information about received power at the booster of a reference signal transmitted from the base station and about noise power at the booster of an uplink signal which is sent from the mobile station to the base station and amplified by the booster;

a second information receiver for receiving information about transmission power of the reference signal at the base station; and a monitoring unit for monitoring the booster in response to the received power of the reference signal at the booster, the noise power of the amplified uplink signal at the booster, and the transmission power of the reference signal at the base station.

Here, the monitoring equipment may further comprise:

a third information receiver for receiving information about an interference quantity in the base station, and the first information receiver may further receive information about an interference quantity of the amplified uplink signal in the booster, and the monitoring unit may monitor the booster in response to the interference quantity of the amplified uplink signal in the booster and the interference quantity in the base station as well.

In a seventh aspect of the present invention, there is provided a monitoring equipment for monitoring a booster for receiving, amplifying and transmitting a signal to be transferred between a mobile station and a base station, the monitoring equipment comprising:

a first information receiver for receiving information about received power at the booster of a reference signal transmitted from the base station and about interference quantity in the booster of an uplink signal which is sent from the mobile station to the base station and amplified by the booster;

a second information receiver for receiving information about transmission power of the reference signal at the base station;

a third information receiver for receiving information about an interference quantity in the base station; and a monitoring unit for monitoring the booster in response to the received power of the reference signal at the booster, the interference quantity of the amplified uplink signal in the booster, the transmission power of the reference signal at the base station and the interference quantity in the base station.

Here, the reference signal may include the information about the interference quantity in the base station, and the third information receiver may receive the information about the interference quantity in the base station by receiving the reference signal.

The third information receiver may receive the information about the interference quantity in the base station, which information is transmitted from the booster.

The third information receiver may receive, at the base station, the information about the interference quantity in the base station, and the monitoring unit may acquire the information about the interference quantity in the base station from the third information receiver via a telephone line.

The reference signal may include information about transmission power of the reference signal at the base station, and the second information receiver may receive the information about the transmission power of the reference signal at the base station by receiving the reference signal.

The second information receiver may receive the information about the transmission power of the reference signal at the base station, which information is transmitted from the booster.

The first information receiver may receive, at the base station, information about the received power at the booster of the reference signal transmitted from the base station and the noise power of the amplified uplink signal at the booster;

the second information receiver may receive, at the base station, the information about the transmission power of the reference signal at the base station; and the monitoring unit may acquire via a telephone line, from the first information receiver, information about the received power at the booster of the reference signal transmitted from the base station and about the noise power of the amplified uplink signal at the booster, and from the second information receiver, the information about the transmission power of the reference signal at the base station.

the first information receiver may further receive information about a condition of the booster; and the monitoring unit may monitor the booster in response to the booster condition, as well.

The first information receiver may receive information about the gain of the uplink signal and/or about the gain of the downlink signal; and the monitoring unit may monitor the booster in response to the gain of the uplink signal and/or the gain of the downlink signal, as well.

Here, the monitoring equipment may further comprise:

a control signal transmitter for transmitting to the booster a control signal for controlling the gain of the uplink signal and/or the gain of the downlink signal, and the monitoring unit may generate the control signal in response to a monitoring result.

Here, the reference signal may be a perch signal.

In a eighth aspect of the present invention, there is provided a booster system including a booster for receiving, amplifying and transmitting a signal to be transferred between a base station and a mobile station, and a monitoring equipment for monitoring the booster, wherein the booster comprises:

an uplink signal amplifier for amplifying an uplink signal sent from the mobile station to the base station;

a received power measuring unit for receiving a reference signal sent from the base station, and for measuring received power of the reference signal at the booster;

a noise power measuring unit for measuring noise power at the booster of the uplink signal amplified by the uplink signal amplifier; and an information transmitter for transmitting information about the received power of the reference signal at the booster and about the noise power of the amplified uplink signal at the booster to the monitoring equipment, and wherein the monitoring equipment comprises:

a first information receiver for receiving the information about the received power of the reference signal at the booster and about the noise power of the uplink signal at the booster;

a second information receiver for receiving information about transmission power of the reference signal at the base station; and a monitoring unit for monitoring the booster in response to the received power of the reference signal at the booster, the noise power of the amplified uplink signal at the booster, and the transmission power of the reference signal at the base station.

In a ninth aspect of the present invention, there is provided a booster system including a booster for receiving, amplifying and transmitting a signal to be transferred between a base station and a mobile station, and a monitoring equipment for monitoring the booster, wherein the booster comprises:

an uplink signal amplifier for amplifying an uplink signal sent from the mobile station to the base station;

a received power measuring unit for receiving a reference signal sent from the base station, and for measuring received power of the reference signal at the booster;

an interference measuring unit for measuring an interference quantity in the booster of the uplink signal amplified by the uplink signal amplifier; and an information transmitter for transmitting information about the received power of the reference signal at the booster and about the interference quantity of the amplified uplink signal in the booster to the monitoring equipment, and wherein the monitoring equipment comprises:

a first information receiver for receiving the information about the received power of the reference signal at the booster and about the interference quantity of the amplified uplink signal at the booster;

a second information receiver for receiving information about transmission power of the reference signal at the base station;

a third information receiver for receiving interference quantity in the base station; and a monitoring unit for monitoring the booster in response to the received power of the reference signal at the booster, the interference quantity of the amplified uplink signal in the booster, the transmission power of the reference signal at the base station, and the interference quantity in the base station.

In a tenth aspect of the present invention, there is provided a control method of controlling, in a booster for receiving, amplifying and transmitting a signal to be transferred between a base station and a mobile station, an gain of an uplink signal sent from the mobile station to the base station, the control method comprising the steps of:

receiving a reference signal sent from the base station, and measuring received power of the reference signal at the booster;

a receiving information about transmission power of the reference signal at the base station;

measuring noise power at the booster of the uplink signal amplified by the booster; and a controlling an gain of the uplink signal in response to the transmission power of the reference signal at the base station, the received power of the reference signal at the booster and the noise power of the amplified uplink signal at the booster.

In a eleventh aspect of the present invention, there is provided a control method of controlling, in a booster for receiving, amplifying and transmitting a signal to be transferred between a base station and a mobile station, an gain of an uplink signal sent from the mobile station to the base station, the control method comprising the steps of:

receiving a reference signal sent from the base station, and measuring received power of the reference signal at the booster;

receiving information about transmission power of the reference signal at the base station;

measuring an interference quantity in the booster of the uplink signal amplified by the booster;

receiving information about the interference quantity in the base station; and controlling the gain of the uplink signal in response to the transmission power of the reference signal at the base station, the received power of the reference signal at the booster, the interference quantity of the amplified uplink signal in the booster and the interference quantity in the base station.

In a twelveth aspect of the present invention, there is provided a monitoring method of monitoring a booster for receiving, amplifying and transmitting a signal to be transferred between a mobile station and a base station, the monitoring method comprising the steps of:

receiving information about received power at the booster of a reference signal transmitted from the base station and about noise power at the booster of an uplink signal which is sent from the mobile station to the base station and amplified by the booster;

receiving information about transmission power of the reference signal at the base station; and monitoring the booster in response to the received power of the reference signal at the booster, the noise power of the amplified uplink signal at the booster, and the transmission power of the reference signal at the base station.

In a thirteenth aspect of the present invention, there is provided a monitoring method of monitoring a booster for receiving, amplifying and transmitting a signal to be transferred between a mobile station and a base station, the monitoring equipment comprising:

receiving information about received power at the booster of a reference signal transmitted from the base station and about interference quantity in the booster of an uplink signal which is sent from the mobile station to the base station and amplified by the booster;

receiving information about transmission power of the reference signal at the base station;

receiving information about an interference quantity in the base station; and monitoring the booster in response to the received power of the reference signal at the booster, the interference quantity of the amplified uplink signal in the booster, the transmission power of the reference signal at the base station and the interference quantity in the base station.

The foregoing configuration makes it possible to reduce the harmful effect of the booster noise on the base station by controlling the gain of the booster.

In addition, the gain control of the booster makes it possible to control the balance between the traffic under the booster and the traffic under the base station.

Moreover, the monitoring equipment can carry out its monitoring appropriately using the information about the booster, which is transmitted to it, such as the information about parameters for setting the gain of the booster, and information about the condition of the booster.

The above and other objects, effects, features and advantages of the present invention will become more apparent from the following description of embodiments thereof taken in conjunction with the accompanying drawings.

DETAILED DESCRIPTION OF PREFERRED EMBODIMENTS

The embodiments in accordance with the present invention will now be described with reference to accompanying drawings.

First Embodiment

Figure 1:
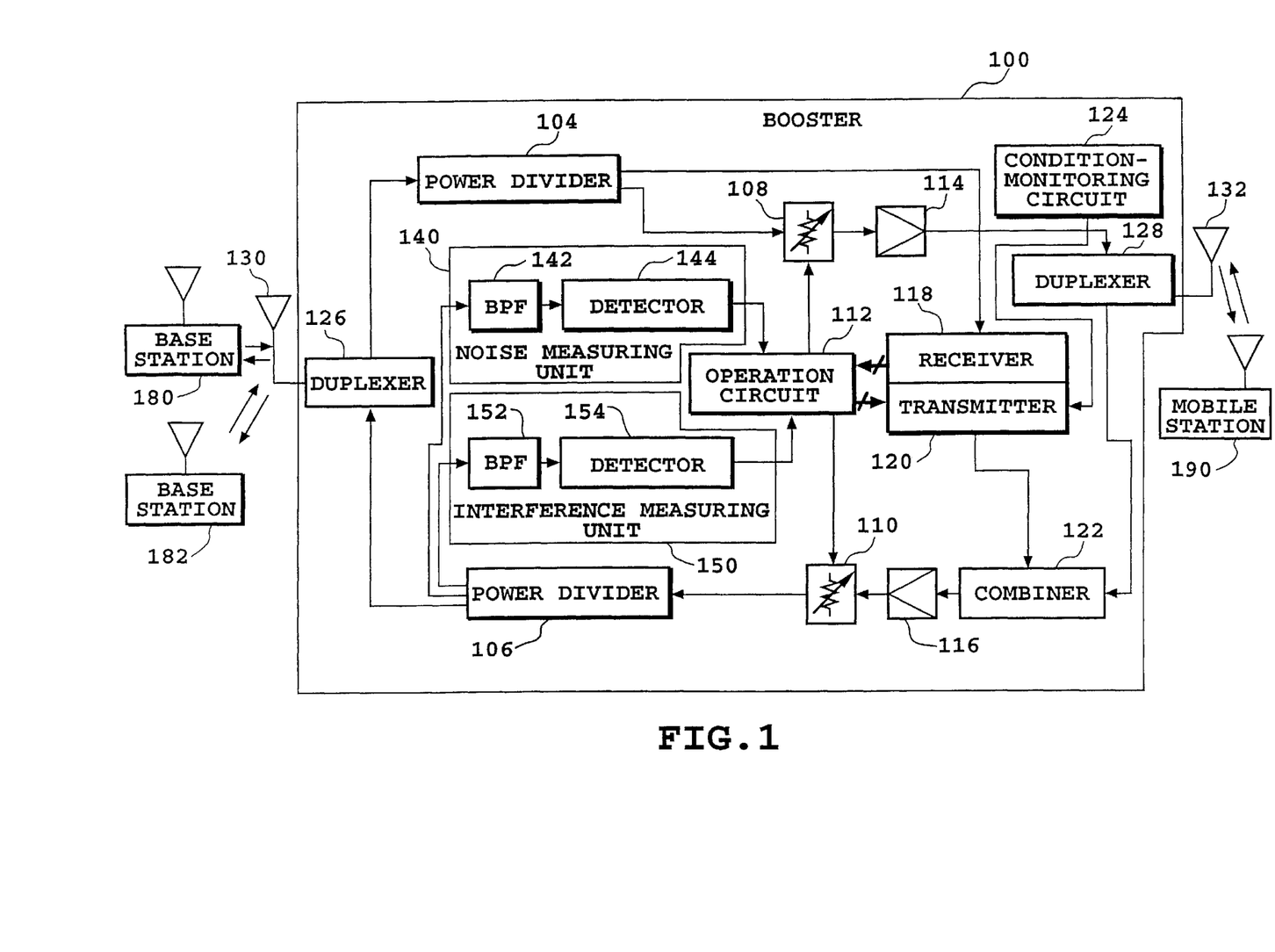
FIG. 1 is a block diagram showing a configuration of a booster of a first embodiment in accordance with the present invention.

FIG. 1 is a block diagram showing a configuration of a booster of a first embodiment in accordance with the present invention.

A booster 100 of the present embodiment comprises power dividers 104 and 106, variable attenuators 108 and 110, an operation circuit 112, amplifiers 114 and 116, a receiver 118, a transmitter 120, a combiner 122, a condition-monitoring circuit 124, duplexers 126 and 128, antennas 130 and 132, a noise measuring unit 140 and an interference measuring unit 150. The noise measuring unit 140 includes a bandpass filter (BPF) 142 and a detector 144, and the interference measuring unit 150 includes a bandpass filter 152 and a detector 154.

The booster 100 receives, amplifies and transmits downlink signals from base stations 180, 182 and the like to a mobile station 190 and the like, and uplink signals from the mobile station 190 and the like to the base stations 180, 182 and the like. More specifically, it receives the signals transmitted from the base stations 180, 182 and the like, amplifies the received signals, and transmits the amplified signals to the mobile station 190 and the like. On the other hand, it receives the signals transmitted from the mobile station 190 and the like, amplifies the received signals, and transmits the amplified signals to the base stations 180, 182 and the like.

The signals (downlink signals) transmitted from the base stations 180, 182 and the like are supplied to the variable attenuator 108 via the antenna 130, duplexer 126 and power divider 104 and then to the amplifier 114 with being amplified through the variable attenuator 108 and amplifier 114 by a particular gain, and are transmitted to the mobile station 190 and the like via the duplexer 128 and antenna 132. On the other hand, the signals (uplink signals) transmitted from the mobile station 190 and the like are supplied to the amplifier 116 via the antenna 132, duplexer 128 and combiner 122, and then to the variable attenuator 110 with being amplified through the amplifier 116 and variable attenuator 110 by a particular gain, and are transmitted to the base stations 180, 182 and the like via the power divider 106, duplexer 126 and antenna 130.

In the present embodiment, the receiver 118 has the same configuration as the receiver of the mobile station, and the transmitter 120 has the same configuration as the transmitter of the mobile station so that they are inexpensive.

The booster 100 controls the gain of the uplink signals and the gain of the downlink signals in accordance with the foregoing expression (4) to reduce the effect of the noise of the booster 100 on the base stations 180, 182 and the like. It is assumed here that the noise figure $NF_o$ of the base station is known in advance.

In the mobile communication, each base station normally transmits a perch signal continuously which is used for searching for a visited cell. The perch signal, when it includes information about its transmission power (value) $P_{tpch}$ [dBm] at the base station, enables the booster to obtain the propagation loss $L_1$ (=$P_{tpch}$-$P_{rpch}$) [dB] between the base station and the booster from the transmission power $P_{tpch}$ and the received power (value) $P_{rpch}$ [dBm] of the perch signal at the booster.

In the present embodiment, receiving the perch signal, the receiver 118 extracts from the perch signal the information about the transmission power of the perch signal at the base station (and the information about the interference quantity of the amplified uplink signal in the base station). Furthermore, the receiver 118 measures the received power of the perch signal received. It is also possible for the booster to directly receive the information about the transmission power of the perch signal at the base station without receiving the perch signal.

Although the present embodiment uses the perch signal as a reference signal for measuring the propagation loss between the booster and base station or the like, it can also use a signal other than the perch signal as the reference signal.

The booster measures the noise power $N_b$ of the amplified uplink signal at the booster using the noise measuring unit 140. As for the noise measurement, it is enough to measure power density. Thus, the present embodiment measures the noise power $N_b$ using the narrow-band bandpass filter 142 with a frequency immediately next to the operating band, and the detector 144. Once the noise power $N_b$ has been measured, the noise figure of the booster $NF_b$ can be obtained.

The effect of the noise of the booster 100 on the base stations 180, 182 and the like can be reduced by automatically controlling the gain $G_b$ of the booster 100 using the noise figure $NF_o$ of the base station thus obtained, the propagation loss $L_1$ between the base station and the booster, the noise figure $NF_b$ of the booster and expression (4). The control of the gain of the uplink signals is carried out by transferring a gain setting signal from the operation circuit 112 to the amplifier 116 and variable attenuator 110 to control them. On the other hand, the control of the gain of the downlink signals is carried out by transferring a gain setting signal from the operation circuit 112 to the amplifier 114 and variable attenuator 108 to control them.

The gain of the uplink signals may differ from the gain of the downlink signals. In data communication, data volumes usually differ between downlink channels and uplink channels, and generally, the downlink channels have a greater volume. In such a case, it is possible to operate the booster at minimum power required by providing a difference between the gain of the uplink signals and the gain of the downlink signals.

When varying the gain of the uplink signals, the amplifier 116 and variable attenuator 110 can control the time constant for the variation. Likewise, when varying the gain of the downlink signals, the amplifier 114 and variable attenuator 108 can control the time constant for the variation. It is preferable that the time constant for varying the gain of the uplink signals and that for varying the gain of the downlink signals be increased in order to prevent the effect on the transmission power control of the base station or mobile station.

In the present embodiment, the booster 100 always scans the perch signals of peripheral base stations, and the receiver 118 searches for a perch signal with the highest received level. For example, when a second base station is newly installed near the booster 100, and if the propagation loss $L_2$ between the second base station and the booster 100 satisfies the relationship $L_1 > L_2$, where $L_1$ is the propagation loss between the first base station and the booster 100, the gain $G_b$ of the booster 100 is controlled to satisfy the foregoing expression (6) (corresponding to expression (4)). Thus, when the new base station is installed near the booster 100, the gain of the booster is reduced in response to the new base station to weaken the effect of the noise and interference quantity on the base station.

On the contrary, when the base station, which has a small propagation loss to the booster and is most likely to be suffering from the noise and interference from the booster, becomes inoperable because of a disaster or the like, the gain of the booster can be increased within the limit satisfying the relationship of the foregoing expression (4). Even if the base station exchanging signals with the booster becomes inoperable, the booster can continue the mobile communication service by searching for the perch signals from the peripheral base stations, and by amplifying radio waves, if the booster can receive the radio waves from at least one of the base stations.

The booster 100 controls the balance between the traffic under the booster and the traffic under the base station by adjusting the gain of the booster in accordance with the relationship between $I_o$ and $I_b'=G_b+I_b-L$.

As described above, although the present embodiment extracts from the perch signal the information about the interference quantity $I_o$ in the base station, the information can also be directly received from the base station without receiving the perch signal.

The propagation loss L between the base station and the booster can be obtained by the method described above.

The interference quantity $G_b+I_b$ of the amplified uplink signals in the booster is measured by the interference measuring unit 150. As for the interference quantity measurement, it is enough to measure the power density. Thus, in the present embodiment, the interference quantity $G_b+I_b$ is measured using the narrow-band bandpass filter 152 passing signals within the band, and the detector 154. Once the $G_b+I_b$ and L have been obtained, the $I_b'$ can be obtained.

The balance between the traffic under the booster and the traffic under the base station can be adjusted by controlling the gain $G_b$ of the booster 100 in response to the interference quantity $I_o$ in the base station and the interference quantity $I_b'$ to the base station by the amplified uplink signals.

The booster 100 transmits to the monitoring equipment the information about the parameters for setting the gain of the booster 100, the information on the condition of the booster 100 and the like. On the other hand, receiving a control signal from the monitoring equipment, the booster 100 follows the control signal.

In the present embodiment, the booster 100 also transmits to the monitoring equipment the information about the parameters of setting the gain (the transmission power of the perch signal at each base station, the received power of the perch signal at the booster, the noise power of the amplified uplink signal at the booster, the interference quantity of the amplified uplink signal in the booster and the interference quantity in the base station), the booster condition and the gain (the gain of the uplink signals and the gain of the downlink signals). In the present embodiment, although all items of the information are assumed to be transmitted to the monitoring equipment, part of them can be transmitted, or other items of information can be transmitted.

The information about the conditions of the booster is acquired by the condition-monitoring circuit 124, and is transmitted to the transmitter 120. The information about the conditions of the booster includes information about the power supply of the booster 100, information about the power supply of the amplifiers 114 and 116 and the like.

Receiving these items of the information, the monitoring equipment can detect from them the failure or malfunction of the booster 100 or the possibility thereof. In addition, it can control the booster 100 by sending the control signal to the booster 100.

For example, the monitoring equipment carries out processing similar to that of the operation circuit 112 in the booster 100 using the parameters for setting the gain transmitted from the booster, thereby obtaining the gain. If the obtained gain disagrees with the gain transmitted from the booster, a failure of the operation circuit 112, amplifiers 114 and 116 or the like can take place.

If any one of the variable attenuators 108 and 110 and the amplifiers 114 and 116 falls into a failure, the balance between the uplink and down link is extremely disturbed. When the gain of the uplink signals is greater than the gain of the downlink signals, the transmission power of the mobile stations communicating under the control of the booster 100 usually increases, which in turn increases the interference quantity. Since the monitoring equipment receives the information about the interference quantity of the amplified uplink signals to the booster, it can distinguish between an increase in the interference quantity due to a normal increase in the traffic and an increase in the interference quantity due to a failure. In contrast, when the gain of the downlink signals is greater than the gain of the uplink signals, this will degrade the quality of the uplink channels, and hence increases the transmission power of the mobile stations to maintain the prescribed quality, thereby reducing the area. Therefore, with regard to the variables $I_o$, $G_b$, $I_b$ and L defined above, there can arise an abnormal relationship as $G_b+I_b-L>I_o$.

As described above, when it receives the control signal from the monitoring equipment, the booster 100 follows the control signal. The control signal can include, for example, a signal for controlling the gain, a signal for resetting the booster 100, and a signal for turning off the power supply to the booster 100. For example, when the booster 100 receives the signal for controlling the gain, the operation circuit 112 controls the gain of the uplink signals and/or the gain of the downlink signals in response to the control signal.

In this way, the monitoring equipment can achieve appropriate monitoring of the booster.

Second Embodiment

Figure 2:
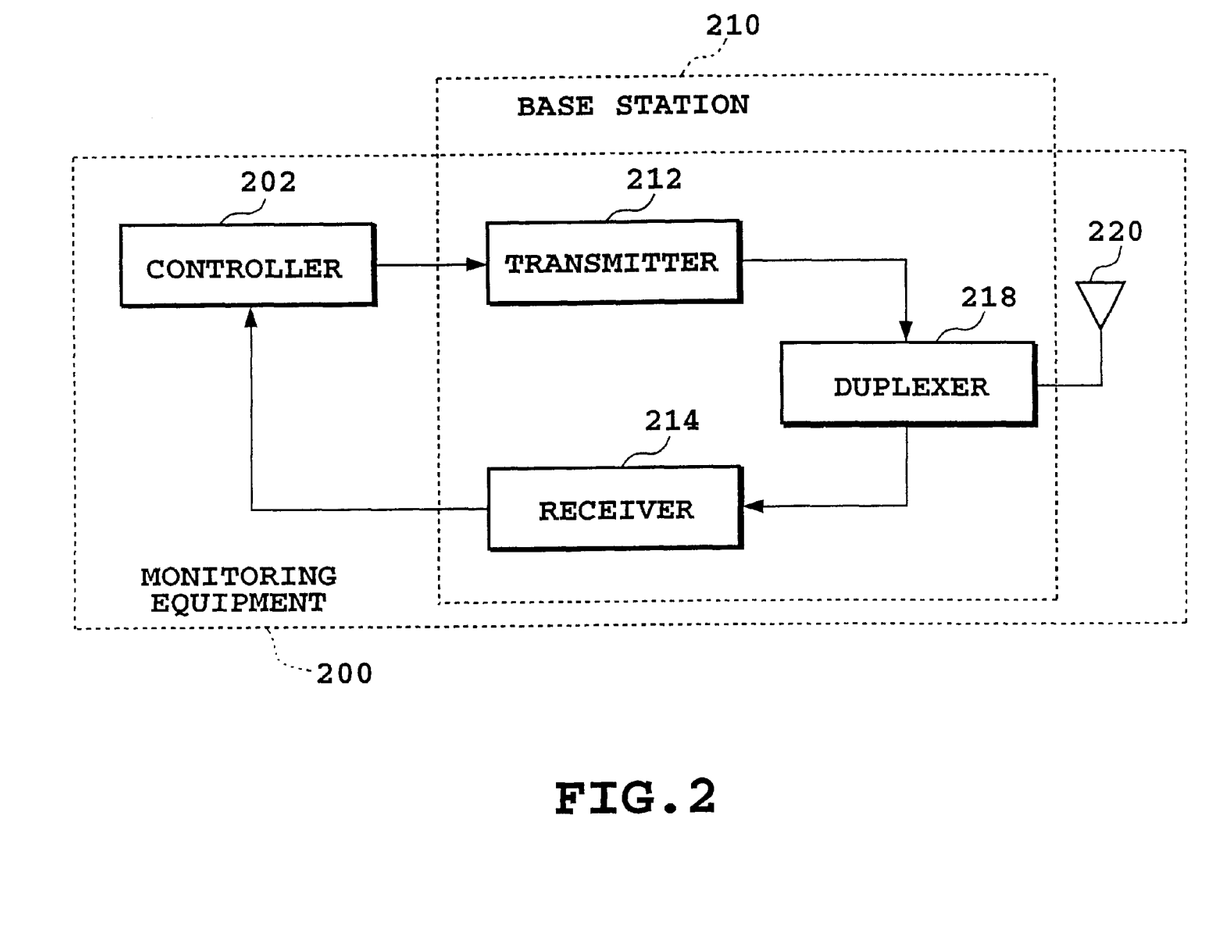
FIG. 2 is a block diagram showing a configuration of a booster monitoring equipment of a second embodiment in accordance with the present invention.

FIG. 2 is a block diagram showing a configuration of the monitoring equipment of the booster of a second embodiment in accordance with the present invention.

The monitoring equipment 200 of the present embodiment comprises a controller 202, a transmitter 212, a receiver 214, a duplexer 218 and an antenna 220. In the present embodiment, the transmitter 212, receiver 214, duplexer 218 and antenna 220 are the same as those of the base station 210 so that the base station 210 also carries out transmission and reception using the transmitter 212 and receiver 214.

In the present embodiment, the receiver 214 and transmitter 212 have the same configurations as the receiver and transmitter of the mobile station, both of which are inexpensive.

The controller 202 receives information about parameters for setting the gain of the booster, information about the conditions of the booster and the like, via the antenna 220, duplexer 218 and receiver 214, and monitors the booster using these items of information. More specifically, it detects a failure or malfunction of the booster 100, or their possibility from the information. In addition, it sends a control signal to the booster via the transmitter 212, duplexer 218 and antenna 220 to control the booster as needed.

The various information items needed for monitoring do not require any extra receiver because they are received by the base station as an ordinary traffic channel.

Examples of detecting a failure or malfunction, or their possibilities, and the example of the control signal are the same as those described in the first embodiment. The monitoring equipment 200 according to the present embodiment can receive various information items, which enables appropriate monitoring of the booster.

The monitoring equipment 200 of the present embodiment can be combined with the booster 100 of the first embodiment to configure a booster system. The booster 100 transmits to the monitoring equipment 200 the information about parameters for setting gain (such as the transmission power of the perch signal at each base station, received power of the perch signal at the booster, noise power of the amplified uplink signal at the booster, interference quantity of the amplified uplink signal in the booster and interference quantity in the base station), about the booster conditions, and about the gain (the gain of the uplink signals and the gain of the downlink signals). Receiving these information items, the monitoring equipment 200 monitors the booster on the basis of these information items.

Third Embodiment

It is unnecessary for the booster to transmit the information about the transmission power of the perch signal at the base station and the information about the interference quantity in the base station, because they can be directly transmitted from the base station to the controller of the monitoring equipment without passing through the booster.

Figure 3:
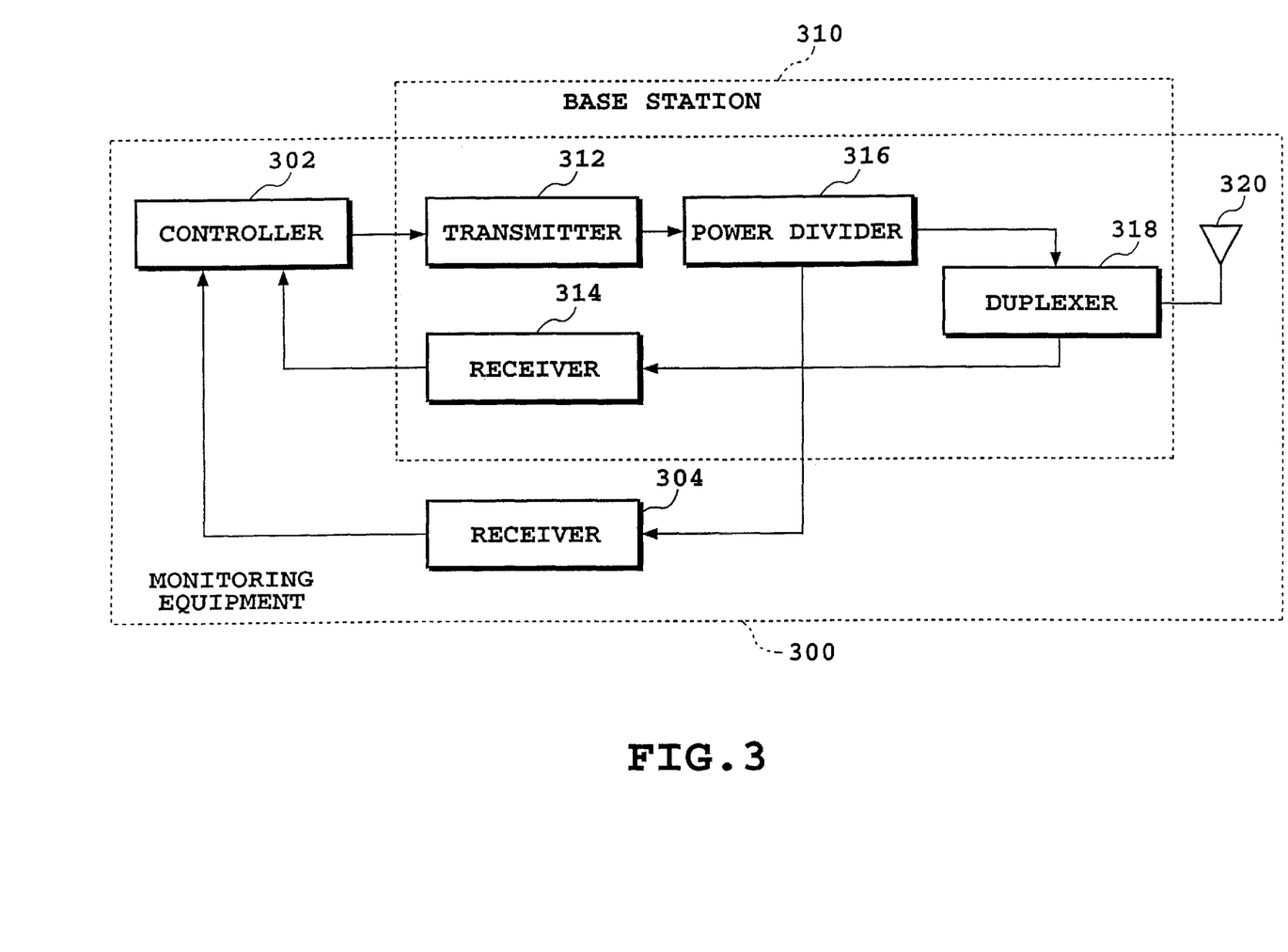
FIG. 3 is a block diagram showing a configuration of a booster monitoring equipment of a third embodiment in accordance with the present invention.

FIG. 3 is a block diagram showing a configuration of a booster monitoring equipment of a third embodiment in accordance with the present invention.

The monitoring equipment 300 according to the present embodiment comprises a controller 302, a transmitter 312, receivers 304 and 314, a power divider 316, a duplexer 318, and an antenna 320. The present embodiment shares the transmitter 312, receiver 314, power divider 316, duplexer 318 and antenna 320 with the base station 310.

Although the monitoring equipment 300 according to the present embodiment has nearly the same functions as those of the monitoring equipment 200 according to the second embodiment, it can receive by the receiver 304 a signal sent from the base station via the power divider 316, and transfer it to the controller 302. Thus, the monitoring equipment 300 can acquire the above-mentioned information about the transmission power of the perch signal at the base station and the information about the interference quantity in the base station without having the booster transmit them. If the perch signal includes these information items, the receiver 304 can collect them by receiving the perch signal via the power divider 316.

Thus, the monitoring equipment 300 according to the present embodiment can receive the information items for implementing appropriate monitoring of the booster. Although the monitoring equipment 300 according to the present embodiment has a configuration more complicated than that of the monitoring equipment 200 according to the second embodiment because of the receiver 304, it can collect the information about the transmission power of the perch signal at the base station and the information about the interference quantity in the base station without transmitting them from the booster.

Fourth Embodiment

The controller of the monitoring equipment can be installed at a location apart from the base station.

Figure 4:
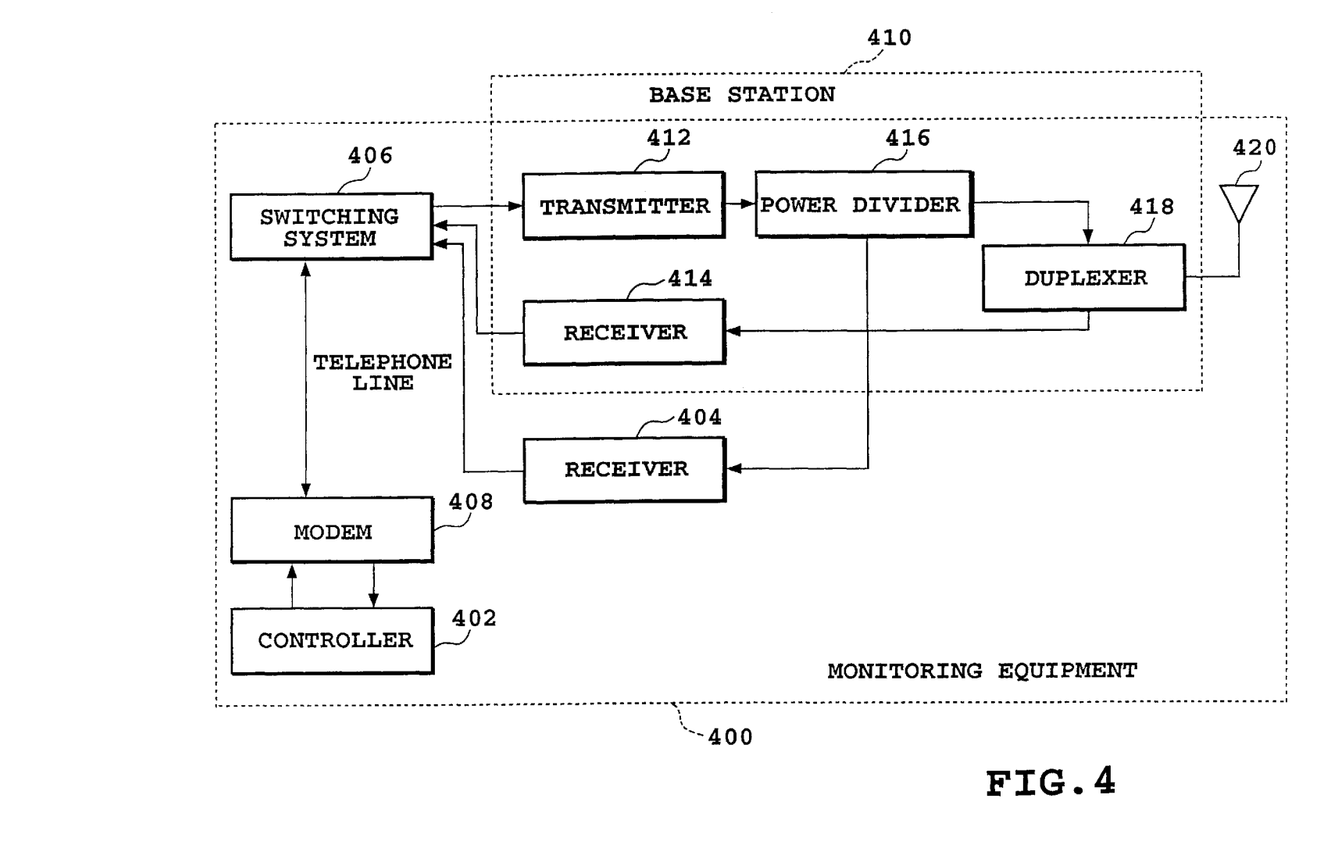
FIG. 4 is a block diagram showing a configuration of a booster monitoring equipment of a fourth embodiment in accordance with the present invention.

FIG. 4 is a block diagram showing a configuration of a booster monitoring equipment of a fourth embodiment in accordance with the present invention.

The monitoring equipment 400 according to the present embodiment comprises a controller 402, a switching system 406, a modem 408, a transmitter 412, receivers 404 and 414, a power divider 416, a duplexer 418 and an antenna 420. The present embodiment shares the transmitter 412, receiver 414, power divider 416, duplexer 418 and antenna 420 with the base station 410.

In the present embodiment, the base station 410 receives the information from the booster, and transmits the information to the controller 402 by telephone line.

Since a booster is often installed in silent zones among mountains, it is unavoidable that the booster is placed on a mountain or the like, extending the distance between the booster and the monitoring equipment, which presents a problem of increasing the cost of installing a telephone line connecting them.

In vies of this, the present embodiment has the base station receive information from the booster by radio, bringing about a partial solution for the cost.

The booster usually carries out telephone conversations with the base station that sends the perch signal bringing about the maximum received power. When a new base station is installed at such a location as providing the booster with a propagation loss less than before, the upstream base station of the booster is changed to the new base station. Therefore, when the booster monitoring equipment is installed at the same location as a particular base station, the change of the upstream base station of the booster will bring about a change of the situation: the booster continues to communicate with the monitoring equipment of the primary upstream base station; or a new monitoring equipment must be installed in the new upstream base station of the booster.

In contrast, installing the controller of the monitoring equipment at a location apart from the base station via telephone lines as in the present embodiment can concentrate the monitoring function at one place.

The monitoring equipment 400 according to the present embodiment can also receive the various items of information required for the monitoring, enabling appropriate monitoring of the booster. Although the monitoring equipment 400 according to the present embodiment introduces the remote control via the telephone lines to the monitoring equipment 300 according to the third embodiment, the monitoring equipment 200 according to the second embodiment can also introduce the remote control using the telephone lines.

Supplements

Although the foregoing embodiments carry out the gain control of both uplink signals and downlink signals in the same manner, they can perform the gain control of the downlink signals separately from the gain control of the uplink signals, or only the gain control of the uplink signals.

As described above, the present invention makes it possible to reduce the adverse effect of the booster noise on the base station by controlling the gain of the booster.

In addition, it can adjust the balance between the traffic under the booster and the traffic under the base station by controlling the gain of the booster.

Moreover, transmitting to the monitoring equipment the information for monitoring the booster (the information about parameters for setting the gain of the booster, information about the condition of the booster and the like) enables the monitoring equipment to carry out appropriate monitoring of the booster using these information items.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A booster for receiving, amplifying and transmitting a signal to be transferred between a base station and a mobile station, said booster comprising:
   an uplink signal amplifier for amplifying an uplink signal from the mobile station to the base station;
   a received power measuring unit for receiving a reference signal sent from the base station, and for measuring received power of the reference signal at the booster;
   a transmission power information receiver for receiving information about transmission power of the reference signal at the base station;
   a noise power measuring unit for measuring noise power at the booster of the uplink signal amplified by said uplink signal amplifier; and
   a gain controller for controlling a gain of the uplink signal in response to the transmission power of the reference signal at the base station, the received power of the reference signal at the booster and the noise power of the amplified uplink signal at the booster.

2. The booster as claimed in claim 1, wherein
   the reference signal includes information about transmission power of the reference signal at the base station, and wherein
      said transmission power information receiver receives the information about the transmission power of the reference signal at the base station by receiving the reference signal.

3. The booster as claimed in claim 1, wherein the reference signal is a perch signal.

4. The booster as claimed in claim 1, wherein said uplink signal amplifier can vary a time constant for adjusting the gain of the uplink signal.

5. The booster as claimed in claim 1, further comprising:
   a downlink signal amplifier for amplifying a downlink signal sent from the base station to the mobile station, wherein
      said gain controller further controls the gain of the downlink signal in response to the transmission power of the reference signal at the base station, the received power of the reference signal at the booster and the noise power of the amplified uplink signal at the booster.

6. The booster as claimed in claim 5, wherein said downlink signal amplifier can vary a time constant for adjusting the gain of the downlink signal.

7. The booster as claimed in claim 1, further comprising:
   an interference measuring unit for measuring an interference quantity of the amplified uplink signal in the booster; and
   an interference quantity information receiver for receiving information about an interference quantity in the base station, wherein
      said gain controller controls the gain of the uplink signal in response to the transmission power of the reference signal at the base station, the received power of the reference signal at the booster, the noise power of the amplified uplink signal at the booster, the interference quantity of the amplified uplink signal in the booster and the interference quantity in the base station.

8. The booster as claimed in claim 7, wherein
   the reference signal includes information about the interference quantity in the base station, and wherein
      said interference quantity information receiver receives the information about the interference quantity in the base station by receiving the reference signal.

9. The booster as claimed in claim 7, further comprising:
   a downlink signal amplifier for amplifying a downlink signal sent from the base station to the mobile station, wherein
      said gain controller further controls the gain of the downlink signal in response to the transmission power of the reference signal at the base station, the received power of the reference signal at the booster, the noise power of the amplified uplink signal at the booster, the interference quantity of the amplified uplink signal in the booster and the interference quantity in the base station.

10. The booster as claimed in claim 9, wherein said downlink signal amplifier can vary a time constant for adjusting the gain of the downlink signal.

11. A booster for receiving, amplifying and transmitting a signal to be transferred between a base station and a mobile station, said booster comprising:
   an uplink signal amplifier for amplifying an uplink signal sent from the mobile station to the base station;
   a received power measuring unit for receiving a reference signal sent from the base station, and for measuring received power of the reference signal at the booster;
   a transmission power information receiver for receiving information about transmission power of the reference signal at the base station;
   an interference measuring unit for measuring an interference quantity in the booster of the uplink signal amplified by said uplink signal amplifier; an interference quantity information receiver for receiving information about the interference quantity in the base station; and
   a gain controller for controlling the gain of the uplink signal in response to the transmission power of the reference signal at the base station, the received power of the reference signal at the booster, the interference quantity of the amplified uplink signal in the booster and the interference quantity in the base station.

12. The booster as claimed in claim 11, wherein
   the reference signal includes information about the interference quantity in the base station, and wherein
      said interference quantity information receiver receives the information about the interference quantity in the base station by receiving the reference signal.

13. The booster as claimed in claim 11, wherein
   the reference signal includes information about transmission power of the reference signal at the base station, and wherein
      said transmission power information receiver receives the information about the transmission power of the reference signal at the base station by receiving the reference signal.

14. The booster as claimed in claim 11, wherein the reference signal is a perch signal.

15. The booster as claimed in claim 11, wherein said uplink signal amplifier can vary a time constant for adjusting the gain of the uplink signal.

16. The booster as claimed in claim 11, further comprising:

a downlink signal amplifier for amplifying a downlink signal sent from the base station to the mobile station, wherein said gain controller further controls the gain of the downlink signal in response to the transmission power of the reference signal at the base station, the received power of the reference signal at the booster, the interference quantity of the amplified uplink signal in the booster and the interference quantity in the base station.

17. The booster as claimed in claim 16, wherein said downlink signal amplifier can vary a time constant for adjusting the gain of the downlink signal.

18. A booster for receiving, amplifying and transmitting a signal to be transferred between a base station and a mobile station, said booster comprising:

an uplink signal amplifier for amplifying an uplink signal sent from the mobile station to the base station;

a received power measuring unit for receiving a reference signal sent from the base station, and for measuring received power of the reference signal at the booster;

a noise power measuring unit for measuring noise power at the booster of the uplink signal amplified by said uplink signal amplifier; and an information transmitter for transmitting information about the received power of the reference signal at the booster arid about the noise power of the amplified uplink signal at the booster to a monitoring equipment for monitoring the booster.

19. The booster as claimed in claim 18, further comprising:

a booster information acquisition unit for capturing information about a condition of the booster, wherein said information transmitter transmits the information about the condition of the booster to the monitoring equipment for monitoring the booster.

20. The booster as claimed in claim 18, wherein said information transmitter transmits information about the gain of the uplink signal to the monitoring equipment for monitoring the booster.

21. The booster as claimed in claim 18, wherein the reference signal is a perch signal.

22. The booster as claimed in claim 18, wherein said uplink signal amplifier can vary a time constant for adjusting the gain of the uplink signal.

23. The booster as claimed in claim 18, further comprising:

a transmission power information receiver for receiving information about transmission power of the reference signal at the base station, wherein said information transmitter further transmits the information about the transmission power of the reference signal at the base station to the monitoring equipment for monitoring the booster.

24. The booster as claimed in claim 23, wherein the reference signal includes the information about the transmission power of the reference signal at the base station, and wherein said transmission power information receiver receives the information about transmission power of the reference signal at the base station by receiving the reference signal.

25. The booster as claimed in claim 18, further comprising:

a control signal receiver for receiving a control signal from the monitoring equipment; and a booster controller for controlling the booster in accordance with the control signal.

26. The booster as claimed in claim 25, wherein said booster controller controls, when the control signal is a signal for controlling the gain of the uplink signal and/or the gain of the downlink signal, the gain of the uplink signal and/or the gain of the downlink signal in accordance with the control signal.

27. The booster as claimed in claim 18, further comprising:

an interference measuring unit for measuring an interference quantity of the amplified uplink signal in the booster, wherein said information transmitter transmits information about the interference quantity of the amplified uplink signal in the booster to the monitoring equipment for monitoring the booster.

28. The booster as claimed in claim 27, further comprising:

an interference quantity information receiver for receiving information about an interference quantity in the base station, wherein said information transmitter transmits, to the monitoring equipment for monitoring the booster, the information about the interference quantity in the base station.

29. The booster as claimed in claim 28, wherein the reference signal includes the information about the interference quantity in the base station, and wherein said interference quantity information receiver receives the information about the interference quantity in the base station by receiving the reference signal.

30. The booster as claimed in claim 18, further comprising a downlink signal amplifier for amplifying a downlink signal from the base station to the mobile station.

31. The booster as claimed in claim 30, wherein said information transmitter transmits the information about the gain of the downlink signal to the monitoring equipment for monitoring the booster.

32. The booster as claimed in claim 30, wherein said downlink signal amplifier can change a time constant for adjusting the gain of the downlink signal.

33. A booster for receiving, amplifying and transmitting a signal to be transferred between a base station and a mobile station, said booster comprising:

an uplink signal amplifier for amplifying an uplink signal sent from the mobile station to the base station;

a received power measuring unit for receiving a reference signal sent from the base station, and for measuring received power of the reference signal at the booster;

an interference measuring unit for measuring an interference quantity in the booster of the uplink signal amplified by said uplink signal amplifier; and an information transmitter for transmitting information about the received power of the reference signal at the booster and about the interference quantity of the amplified uplink signal in the booster to the monitoring equipment for monitoring the booster.

34. The booster as claimed in claim 33, further comprising:

a booster information acquisition unit for capturing information about a condition of the booster, wherein said information transmitter transmits the information about the condition of the booster to the monitoring equipment for monitoring the booster.

35. The booster as claimed in claim 33, wherein said information transmitter transmits information about the gain of the uplink signal to the monitoring equipment for monitoring the booster.

36. The booster as claimed in claim 33, wherein the reference signal is a perch signal.

37. The booster as claimed in claim 33, wherein said uplink signal amplifier can vary a time constant for adjusting the gain of the uplink signal.

38. The booster as claimed in claim 33, farther comprising:
   an interference quantity information receiver for receiving information about an interference quantity in the base station, wherein
      said information transmitter transmits, to the monitoring equipment for monitoring the booster, the information about the interference quantity in the base station.

39. The booster as claimed in claim 38, wherein
   the reference signal includes the information about the interference quantity in the base station, and wherein
      said interference quantity information receiver receives the information about the interference quantity in the base station by receiving the reference signal.

40. The booster as claimed in claim 33, further comprising:
   a transmission power information receiver for receiving information about transmission power of the reference signal at the base station, wherein
      said information transmitter further transmits the information about the transmission power of the reference signal at the base station to the monitoring equipment for monitoring the booster.

41. The booster as claimed in claim 40, wherein the reference signal includes the information about the transmission power of the reference signal at the base station, and wherein said transmission power information receiver receives the information about transmission power of the reference signal at the base station by receiving the reference signal.

42. The booster as claimed in claim 33, further comprising:
   a control signal receiver for receiving a control signal from the monitoring equipment; and a booster controller for controlling the booster in accordance with the control signal.

43. The booster as claimed in claim 42, wherein said booster controller controls, when the control signal is a signal for controlling the gain of the uplink signal and/or the gain of the downlink signal, the gain of the uplink signal and/or the gain of the downlink signal in accordance with the control signal.

44. The booster as claimed in claim 33, further comprising a downlink signal amplifier for amplifying a downlink signal from the base station to the mobile station.

45. The booster as claimed in claim 44, wherein said information transmitter transmits the information about the gain of the downlink signal to the monitoring equipment for monitoring the booster.

46. The booster as claimed in claim 44, wherein said downlink signal amplifier can change a time constant for adjusting the gain of the downlink signal.

47. A monitoring equipment for monitoring a booster for receiving, amplifying and transmitting a signal to be transferred between a mobile station and a base station, said monitoring equipment comprising:
   a first information receiver for receiving information about received power at the booster of a reference signal transmitted from the base station and about noise power at the booster of an uplink signal which is sent from the mobile station to the base station and amplified by the booster;
   a second information receiver for receiving information about transmission power of the reference signal at the base station; and
   a monitoring unit for monitoring the booster in response to the received power of the reference signal at the booster, the noise power of the amplified uplink signal at the booster, and the transmission power of the reference signal at the base station.

48. The monitoring equipment as claimed in claim 47, wherein the reference signal includes information about transmission power of the reference signal at the base station, and wherein said second information receiver receives the information about the transmission power of the reference signal at the base station by receiving the reference signal.

49. The monitoring equipment as claimed in claim 47, wherein said second information receiver receives the information about the transmission power of the reference signal at the base station, which information is transmitted from the booster.

50. The monitoring equipment as claimed in claim 47, wherein
   said first information receiver receives, at the base station, information about the received power at the booster of the reference signal transmitted from the base station and the noise power of the amplified uplink signal at the booster;
   said second information receiver receives, at the base station, the information about the transmission power of the reference signal at the base station; and
   said monitoring unit acquires via a telephone line, from said first information receiver, information about the received power at the booster of the reference signal transmitted from the base station and about the noise power of the amplified uplink signal at the booster, and from said second information receiver, the information about the transmission power of the reference signal at the base station.

51. The monitoring equipment as claimed in claim 47, wherein said first information receiver further receives information about a condition of the booster; and
   said monitoring unit monitors the booster in response to the booster condition, as well.

52. The monitoring equipment as claimed in claim 47, wherein
   said first information receiver receives information about the gain of the uplink signal and/or about the gain of the downlink signal; and
   said monitoring unit monitors the booster in response to the gain of the uplink signal and/or the gain of the downlink signal, as well.

53. The monitoring equipment as claimed in claim 47, further comprising:
   a control signal transmitter for transmitting to the booster a control signal for controlling the gain of the uplink signal and/or the gain of the downlink signal, wherein said monitoring unit generates the control signal in response to a monitoring result.

54. The monitoring equipment as claimed in claim 47, wherein the reference signal is a perch signal.

55. The monitoring equipment as claimed in claim 47, further comprising:

a third information receiver for receiving information about an interference quantity in the base station, wherein
said first information receiver further receives information about an interference quantity of the amplified uplink signal in the booster, and
said monitoring unit monitors the booster in response to the interference quantity of the amplified uplink signal in the booster and the interference quantity in the base station as well.

56. The monitoring equipment as claimed in claim 55, wherein
the reference signal includes the information about the interference quantity in the base station, and wherein said third information receiver receives the information about the interference quantity in the base station by receiving the reference signal.

57. The monitoring equipment as claimed in claim 55, wherein said third information receiver receives the information about the interference quantity in the base station, which information is transmitted from the booster.

58. The monitoring equipment as claimed in claim 55, wherein said third information receiver receives, at the base station, the information about the interference quantity in the base station, and said monitoring unit acquires the information about the interference quantity in the base station from said third information receiver via a telephone line.

59. A monitoring equipment for monitoring a booster for receiving, amplifying and transmitting a signal to be transferred between a mobile station and a base station, said monitoring equipment comprising:
a first information receiver for receiving information about received power at the booster of a reference signal transmitted from the base station and about interference quantity in the booster of an uplink signal which is sent from the mobile station to the base station and amplified by the booster;
a second information receiver for receiving information about transmission power of the reference signal at the base station;
a third information receiver for receiving information about an interference quantity in the base station; and
a monitoring unit for monitoring the booster in response to the received power of the reference signal at the booster, the interference quantity of the amplified uplink signal in the booster, the transmission power of the reference signal at the base station and the interference quantity in the base station.

60. The monitoring equipment as claimed in claim 59, wherein
the reference signal includes the information about the interference quantity in the base station, and wherein said third information receiver receives the information about the interference quantity in the base station by receiving the reference signal.

61. The monitoring equipment as claimed in claim 59, wherein said third information receiver receives the information about the interference quantity in the base station, which information is transmitted from the booster.

62. The monitoring equipment as claimed in claim 59, wherein
said third information receiver receives, at the base station, the information about the interference quantity in the base station, and
said monitoring unit acquires the information about the interference quantity in the base station from said third information receiver via a telephone line.

63. The monitoring equipment as claimed in claim 59, wherein
the reference signal includes information about transmission power of the reference signal at the base station, and wherein
said second information receiver receives the information about the transmission power of the reference signal at the base station by receiving the reference signal.

64. The monitoring equipment as claimed in claim 59, wherein said second information receiver receives the information about the transmission power of the reference signal at the base station, which information is transmitted from the booster.

65. The monitoring equipment as claimed in claim 59, wherein
said first information receiver receives, at the base station, information about the received power at the booster of the reference signal transmitted from the base station and the noise power of the amplified uplink signal at the booster;
said second information receiver receives, at the base station, the information about the transmission power of the reference signal at the base station; and
said monitoring unit acquires via a telephone line, from said first information receiver, information about the received power at the booster of the reference signal transmitted from the base station and about the noise power of the amplified uplink signal at the booster, and from said second information receiver, the information about the transmission power of the reference signal at the base station.

66. The monitoring equipment as claimed in claim 59, wherein
said first information receiver further receives information about a condition of the booster; and
said monitoring unit monitors the booster in response to the booster condition, as well.

67. The monitoring equipment as claimed in claim 59, wherein
said first information receiver receives information about the gain of the uplink signal and/or about the gain of the downlink signal; and
said monitoring unit monitors the booster in response to the gain of the uplink signal and/or the gain of the downlink signal, as well.

68. The monitoring equipment as claimed in claim 59, further comprising:
a control signal transmitter for transmitting to the booster a control signal for controlling the gain of the uplink signal and/or the gain of the downlink signal, wherein said monitoring unit generates the control signal in response to a monitoring result.

69. The monitoring equipment as claimed in claim 59, wherein the reference signal is a perch signal.

70. A booster system including a booster for receiving, amplifying and transmitting a signal to be transferred between a base station and a mobile station, and a monitoring equipment for monitoring the booster, wherein
said booster comprises:
an uplink signal amplifier for amplifying an uplink signal sent from the mobile station to the base station;
a received power measuring unit for receiving a reference signal sent from the base station, and for measuring received power of the reference signal at the booster; a noise power measuring unit for measuring noise power at the booster of the uplink signal amplified by said uplink signal amplifier; and an information transmitter for transmitting information about the received power of the reference signal at the booster and about the noise power of the amplified uplink signal at the booster to the monitoring equipment, and wherein said monitoring equipment comprises:

a first information receiver for receiving the information about the received power of the reference signal at the booster and about the noise power of the uplink signal at the booster;

a second information receiver for receiving information about transmission power of the reference signal at the base station; and a monitoring unit for monitoring the booster in response to the received power of the reference signal at the booster, the noise power of the amplified uplink signal at the booster, and the transmission power of the reference signal at the base station.

71. A booster system including a booster for receiving, amplifying and transmitting a signal to be transferred between a base station and a mobile station, and a monitoring equipment for monitoring the booster, wherein said booster comprises:

an uplink signal amplifier for amplifying an uplink signal sent from the mobile station to the base station;

a received power measuring unit for receiving a reference signal sent from the base station, and for measuring received power of the reference signal at the booster;

an interference measuring unit for measuring an interference quantity in the booster of the uplink signal amplified by said uplink signal amplifier; and an information transmitter for transmitting information about the received bower of the reference signal at the booster and about the interference quantity of the amplified uplink signal in the booster to the monitoring equipment, and wherein said monitoring equipment comprises:

a first information receiver for receiving the information about the received power of the reference signal at the booster and about the interference quantity of the amplified uplink signal at the booster;

a second information receiver for receiving information about transmission power of the reference signal at the base station;

a third information receiver for receiving interference quantity in the base station; and a monitoring unit for monitoring the booster in response to the received power or the reference signal at the booster, the interference quantity of the amplified uplink signal in the booster, the transmission power of the reference signal at the base station, and the interference quantity in the base station.

72. A control method of controlling, in a booster for receiving, amplifying and transmitting a signal to be transferred between a base station and a mobile station, a gain of an uplink signal sent from the mobile station to the base station, said control method comprising the steps of:

receiving a reference signal sent from the base station, and measuring received power of the reference signal at the booster; receiving information about transmission power of the reference signal at the base station;

measuring noise power at the booster of the uplink signal amplified by said booster; and controlling a gain of the uplink signal in response to the transmission power of the reference signal at the base station, the received power of the reference signal at the booster and the noise power of the amplified uplink signal at the booster.

73. A control method of controlling, in a booster for receiving, amplifying and transmitting a signal to be transferred between a base station and a mobile station, a gain of an uplink signal sent from the mobile station to the base station, said control method comprising the steps of:

receiving a reference signal sent from the base station, and measuring received power of the reference signal at the booster;

receiving information about transmission power of the reference signal at the base station; measuring an interference quantity in the booster of the uplink signal amplified by said booster;

receiving information about the interference quantity in the base station; and controlling the gain of the uplink signal in response to the transmission power of the reference signal at the base station, the received power of the reference signal at the booster; the interference quantity of the amplified uplink signal in the booster and the interference quantity in the base station.

74. A monitoring method of monitoring a booster for receiving, amplifying and transmitting a signal to be transferred between a mobile station and a base station, said monitoring method comprising the steps of:

receiving information about received power at the booster of a reference signal transmitted from the base station and about noise power at the booster of an uplink signal which is sent from the mobile station to the base station and amplified by the booster;

receiving information about transmission power of the reference signal at the base station; and monitoring the booster in response to the received power of the reference signal at the booster, the noise power of the amplified uplink signal at the booster, and the transmission power of the reference signal at the base station.

75. A monitoring of method of monitoring a booster for receiving, amplifying and transmitting a signal to be transferred between a mobile station and a base station, said monitoring equipment comprising:

receiving information about received power at the booster of a reference signal transmitted from the base station and about interference quantity in the booster of an uplink signal which is sent from the mobile station to the base station and amplified by the booster;

receiving information about transmission power of the reference signal at the base station;

receiving information about an interference quantity in the base station; and monitoring the booster in response to the received power of the reference signal at the booster, the interference quantity of the amplified uplink signal in the booster, the transmission power of the reference signal at the base station and the interference quantity in the base station.

* * * * *

UNITED STATES PATENT AND TRADEMARK OFFICE
CERTIFICATE OF CORRECTION

PATENT NO. : 6,690,915 B1
DATED : February 10, 2004
INVENTOR(S) : Yasushi Ito and Kazuhito Ito It is certified that error appears in the above-identified patent and that said Letters Patent is hereby corrected as shown below:

Column 3,
Line 51, before "gain" change "an" to -- a --

Column 8,
Line 22, before "eighth" change "a" to -- an --

Column 9,
Line 28, before "gain" change "an" to -- a --
Line 34, before "receiving" remove "a"
Line 39, before "controlling" remove "a"
Line 39, before "gain" change "an" to -- a --
Line 44, before "eleventh" change "a" to -- an --
Line 47, before "gain" change "an" to -- a --

Column 11,
Line 58, after "loss" change "$L_1 (=P_{tpch} - P_{rpch})$" to -- $L_1 = (P_{tpch} - P_{rpch})$ --

Column 14,
Line 8, after "uplink and" change "down link" to -- downlink --

Signed and Sealed this

Second Day of August, 2005

JON W. DUDAS
*Director of the United States Patent and Trademark Office*